US006570689B1

(12) United States Patent
Kushita

(10) Patent No.: US 6,570,689 B1
(45) Date of Patent: May 27, 2003

(54) PORTABLE TELEPHONE AND AUTOMOBILE SYSTEM

(75) Inventor: Masayuki Kushita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/395,407

(22) Filed: Sep. 14, 1999

(30) Foreign Application Priority Data

Sep. 14, 1998 (JP) .......................................... 10-259788

(51) Int. Cl.⁷ ............................................. H04B 10/00
(52) U.S. Cl. ...................... 359/149; 359/143; 359/145
(58) Field of Search .............................. 359/149, 143, 359/145, 147, 148

(56) References Cited

U.S. PATENT DOCUMENTS

| 4,543,665 A | * | 9/1985 | Sotelo et al. | 379/56.3 |
| 5,218,466 A | * | 6/1993 | Brooks | 359/152 |
| 5,307,193 A | * | 4/1994 | VanZeeland et al. | 359/145 |
| 5,500,691 A | * | 3/1996 | Martin et al. | 348/734 |
| 5,510,924 A | * | 4/1996 | Terui et al. | 359/143 |
| 5,907,418 A | * | 5/1999 | Walczak et al. | 359/142 |

FOREIGN PATENT DOCUMENTS

| EP | 423733 A2 | 10/1990 |
| EP | 921667 A2 | 6/1999 |
| EP | WO 99/31913 | 6/1999 |
| GB | 2300996 A | 11/1996 |
| JP | 4056428 | 2/1992 |
| JP | 4078233 | 3/1992 |
| JP | 6069855 | 3/1994 |
| JP | 6086361 | 3/1994 |
| JP | 9041747 | 2/1997 |
| JP | 10294972 | 11/1998 |
| JP | 10308802 A | 11/1998 |
| JP | 11055742 | 2/1999 |

* cited by examiner

Primary Examiner—John Tweel
(74) Attorney, Agent, or Firm—Scully, Scott, Murphy & Presser

(57) ABSTRACT

A portable telephone includes an infrared communication processing section, infrared receiving/emitting section, and control section. The control section switches speech communication modes in accordance with a signal received from a distant system through the infrared communication processing section and infrared receiving/emitting section. An automobile system is also disclosed.

16 Claims, 11 Drawing Sheets

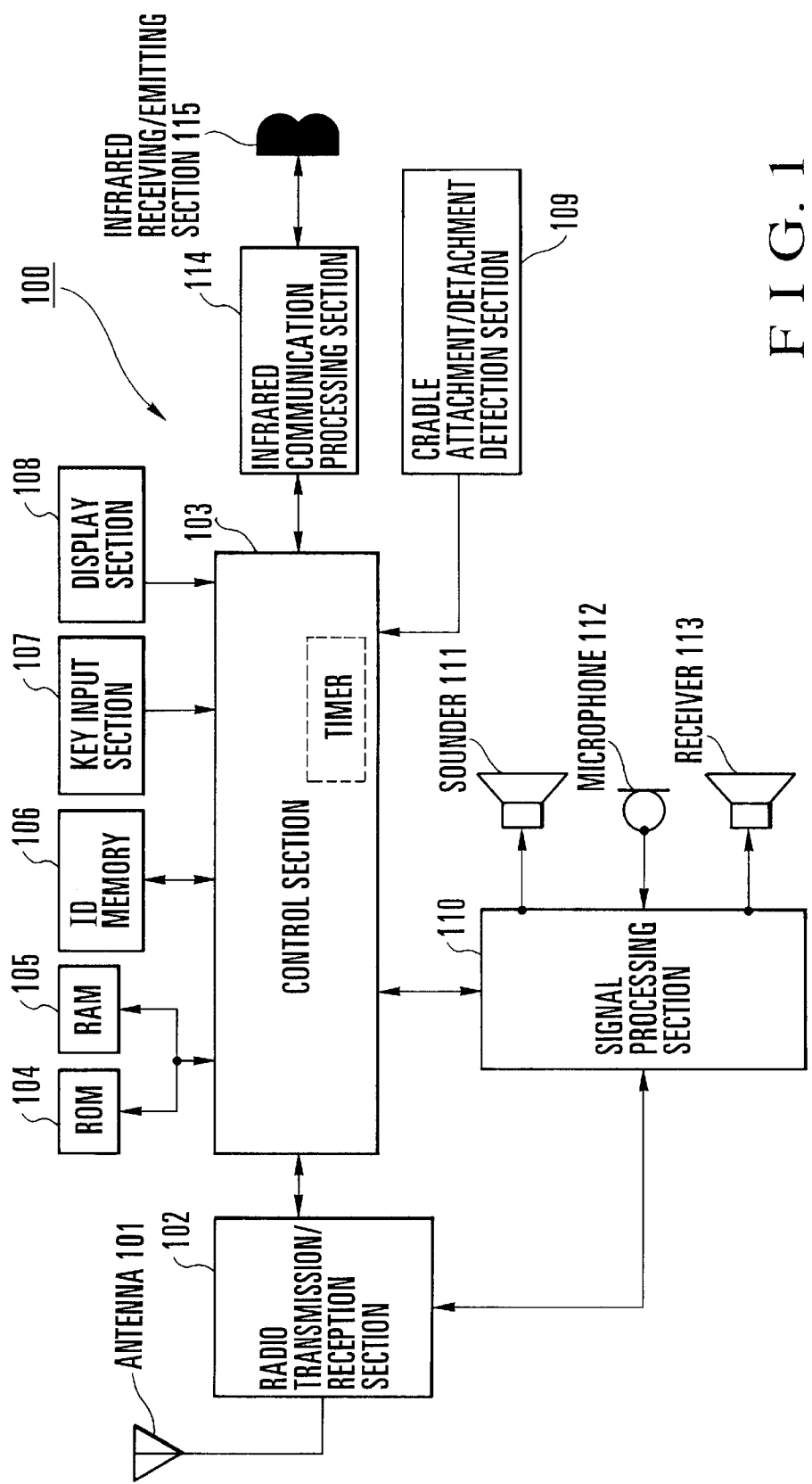
F I G. 1

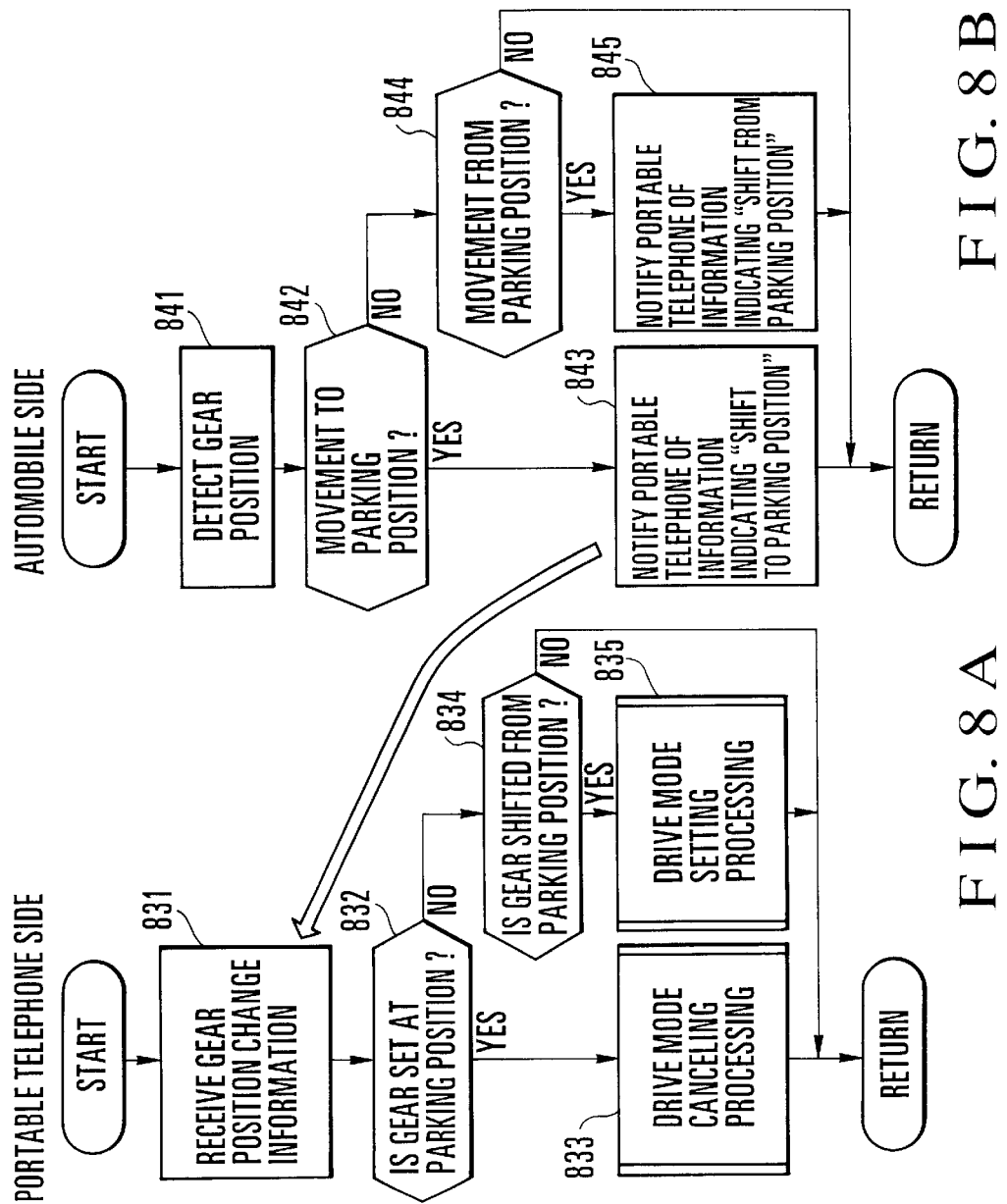

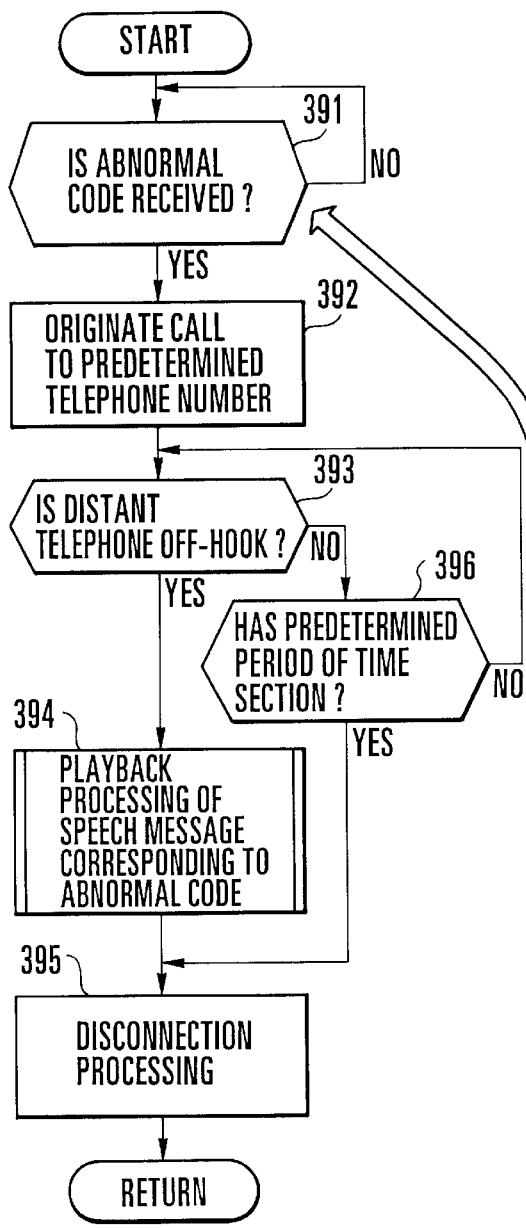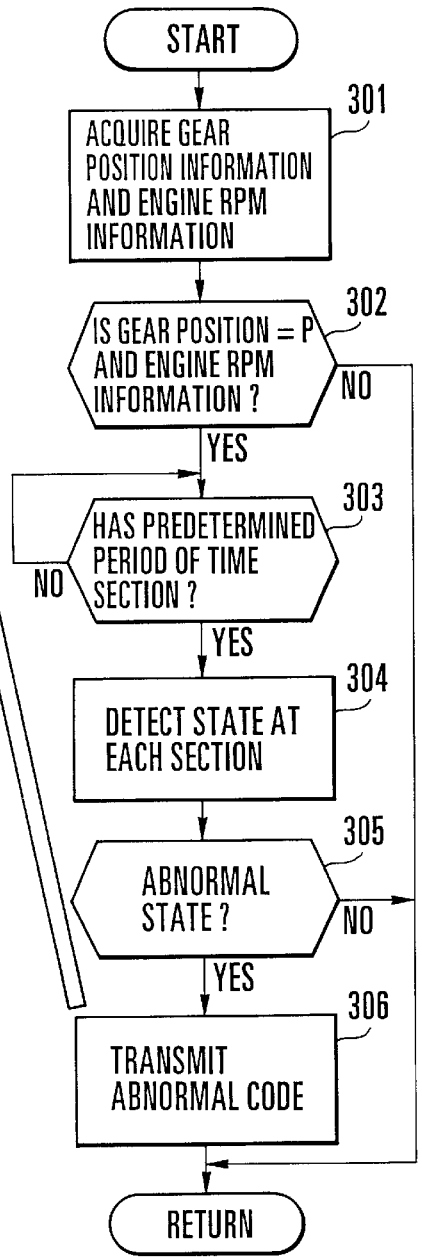
F I G. 11 A
F I G. 11 B

PORTABLE TELEPHONE AND AUTOMOBILE SYSTEM

BACKGROUND OF THE INVENTION

The present invention relates to a portable telephone having an infrared communication function and an automobile system using the portable telephone.

Conventionally, NTT DoCoMo has offered a service named as "D mode" to prevent accidents during driving. When a portable telephone in the D mode receives an incoming call, the message "I am driving now so . . . " is passed to the caller, thereby preventing the call from being directly connected to the driver. This D mode is set by dialing "14151", and is canceled by dialing "14150". A portable telephone allowing the user to perform the above five-digit dialing operation with one button operation has already been available.

There is, however, no link between the automobile system and the portable telephone. The user must therefore separately take the action of driving the automobile and the action of setting the portable telephone in the D mode. For this reason, all drivers who carry portable telephones do not necessarily set the telephones in the D mode. Even a driver who has an intention of setting the D mode may forget to set the D mode. Obviously, if the portable telephone is not set in the D mode, the driver may be distracted by an unexpected call during driving to cause an accident.

SUMMARY OF THE INVENTION

It is an object of the present invention to provide a portable telephone which has the function of communicating with a system operated by a user and can set a link between the user's action of operating the system and the user's action of operating the portable telephone, and an automobile system using the portable telephone.

In order to achieve the above object, according to the present invention, there is provided a portable telephone comprising infrared communication means, and speech communication mode switching means for switching speech communication modes in accordance with a signal received from a distant system through the infrared communication means.

BRIEF DESCRIPTION OF THE DRAWINGS

FIG. 1 is a block diagram showing a portable telephone according to the first embodiment of the present invention;

FIGS. 8A and 8B are flow charts for explaining drive mode canceling operation when a portable telephone is placed on an in-car cradle in the sixth embodiment of the present invention;

FIGS. 11A and 11B are flow charts for explaining the originating operation of a portable telephone when an abnormality occurs in an automobile system in the ninth embodiment of the present invention.

DESCRIPTION OF THE PREFERRED EMBODIMENT

Figure 2:
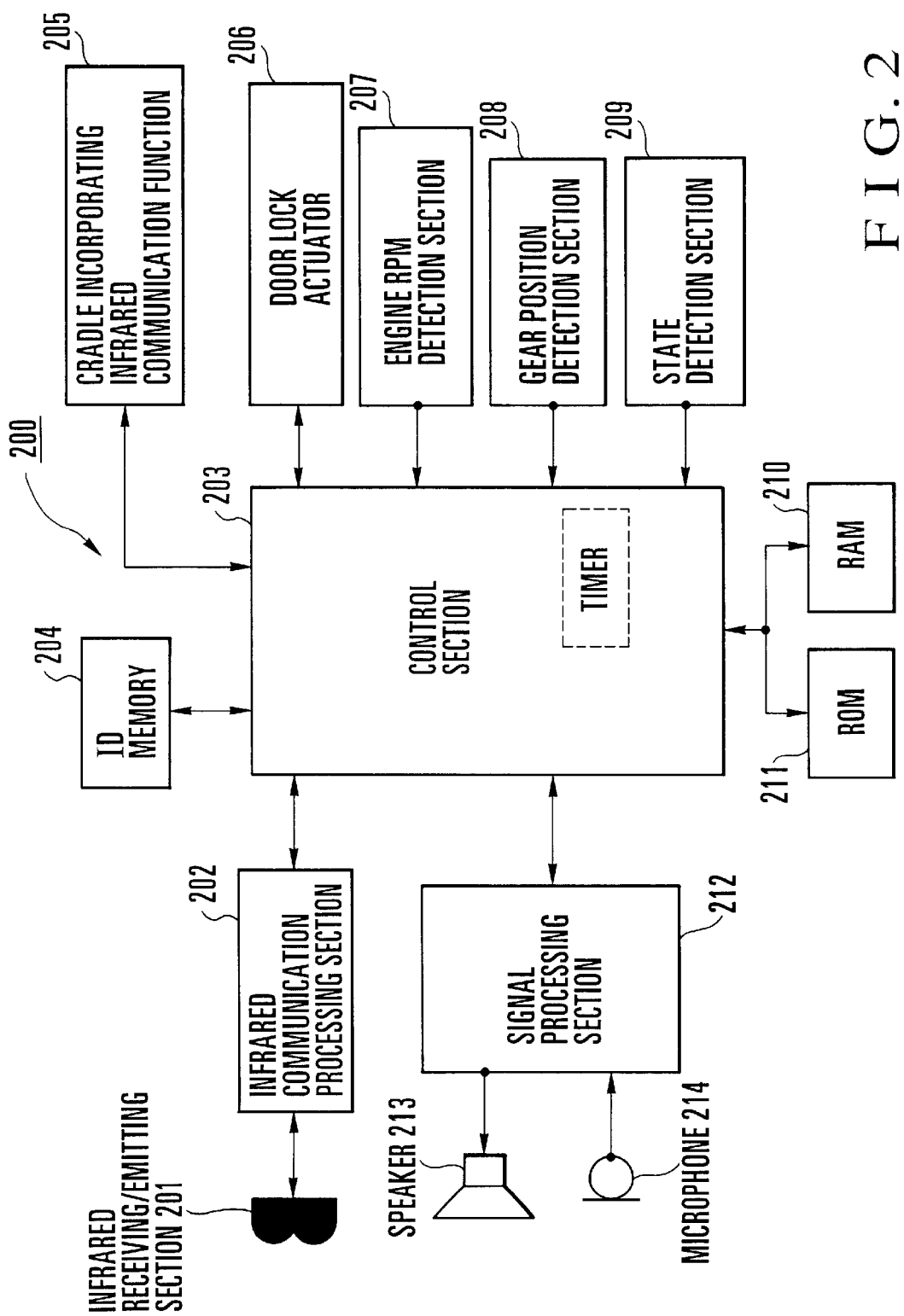
FIG. 2 is a block diagram showing an example of the arrangement of an automobile system using the portable telephone in FIG. 1.

Embodiments of the present invention will be described in detail next with reference to the accompanying drawings.

First Embodiment

FIG. 1 shows a portable telephone according to the first embodiment of the present invention. A portable telephone 100 is characterized in that it has an infrared communication function and can remotely control an automobile system (including a keyless door lock device) 200, and the communication modes are switched in accordance with this remote control operation.

Considering, for example, the vehicle keyless door lock device disclosed in Japanese Patent Laid-Open No. 9-41747, the portable telephone 100 aims to remotely control locking/unlocking of the above keyless door lock device by using the infrared communication function on the basis of the ideas "to unlock door→to get into automobile→to start driving" and "to finish driving→to get off automobile→to lock door". In addition, the portable telephone 100 aims to automatically set/cancel the drive mode in accordance with the above operation.

The portable telephone 100 comprises an antenna 101 for performing speech communication by using radio waves, a radio transmission/reception section 102, a signal processing section 110 constituted by a DSP for speech processing and the like, a control section 103 mainly constituted by a CPU, an ID memory 106 in which an authentication code used to operate a door lock actuator 206 of the automobile system 200 is held, an infrared communication processing section 114, an infrared receiving/emitting section 115, and the like.

FIG. 2 shows an example of the arrangement of an automobile system using the portable telephone in FIG. 1. An automobile system 200 has an infrared communication function. The door lock actuator 206 is remotely controlled by the portable telephone 100.

The automobile system 200 comprises the door lock actuator 206 for locking (door lock on)/unlocking (door lock off) the door, a control section 203 mainly constituted by a CPU and serving to control the operation of the door lock actuator 206, an infrared receiving/emitting section 201 and infrared communication processing section 202 which are used to receive a control command for the door lock actuator 206 from the portable telephone 100, an ID memory 204 used to authenticate the portable telephone 100, state detection sections 207, 208, and 209 for the respective portions, and the like.

A general keyless door lock device has only a reception function of receiving a signal from a control terminal as an infrared communication function. The automobile system 200 in the first embodiment, however, also has a transmission function of transmitting various kinds of information to the portable telephone 100.

When buttons of a KEY input section 107 which are assigned to the operation of the automobile system 200 are operated, an authentication code in the ID memory 106 is transmitted by infrared radiation.

Upon properly receiving the authentication code output from the portable telephone 100, the automobile system 200 controls the door lock actuator 206 to change the ON/OFF state of the door lock (to the OFF (open) state when the current door lock state is the ON (closed) state, and vice versa). The automobile system 200 returns information indicating the door lock state after the change through the infrared communication processing section 202 and infrared receiving/emitting section 201.

Upon reception of the return signal from the automobile system 200, the portable telephone 100 switches the speech communication modes (sets or cancels a drive mode) in accordance with the contents of the signal.

In this case, the drive mode is, for example, the D mode described above, the mode of only playing back a prerecorded response message and recording a message without generating any ringing tone, or the mode of allowing only reception of data.

When, therefore, the door lock control on the automobile is performed by using the portable telephone 100, the speech communication modes of the portable telephone 100 are automatically switched. This method can reliably switch the speech communication modes during driving the automobile, and hence leads to the prevention of accidents, as compared with the conventional method of separately performing door lock control and speech communication mode switching. In addition, since the door is locked (door lock on) by using the portable telephone 100, this scheme also has the effect of preventing the user from leaving the portable telephone 100 behind.

The detailed arrangements and operations of the above portable telephone 100 and automobile system 200 will be described below.

In the portable telephone 100 shown in FIG. 1, the infrared receiving/emitting section 115 converts an electrical signal (RZ (Return to zero) signal) into infrared light and vice versa.

The infrared communication processing section 114 includes a modulation circuit for converting an NRZ (Non-Return to Zero) signal to an RZ signal, a demodulation circuit for converting an RZ signal into an NRZ signal, and a start-stop synchronization serial communication circuit. The start-stop synchronization serial communication circuit of the infrared communication processing section 114 is connected to the CPU of the control section 103 through a bus, converts data written parallel from the CPU through the bus into an NRZ serial signal, and outputs the signal to the modulation circuit. The modulation circuit converts this NRZ serial signal into an RZ serial signal, and outputs the signal to the light-emitting circuit of the infrared receiving/emitting section 115.

Figure 3:
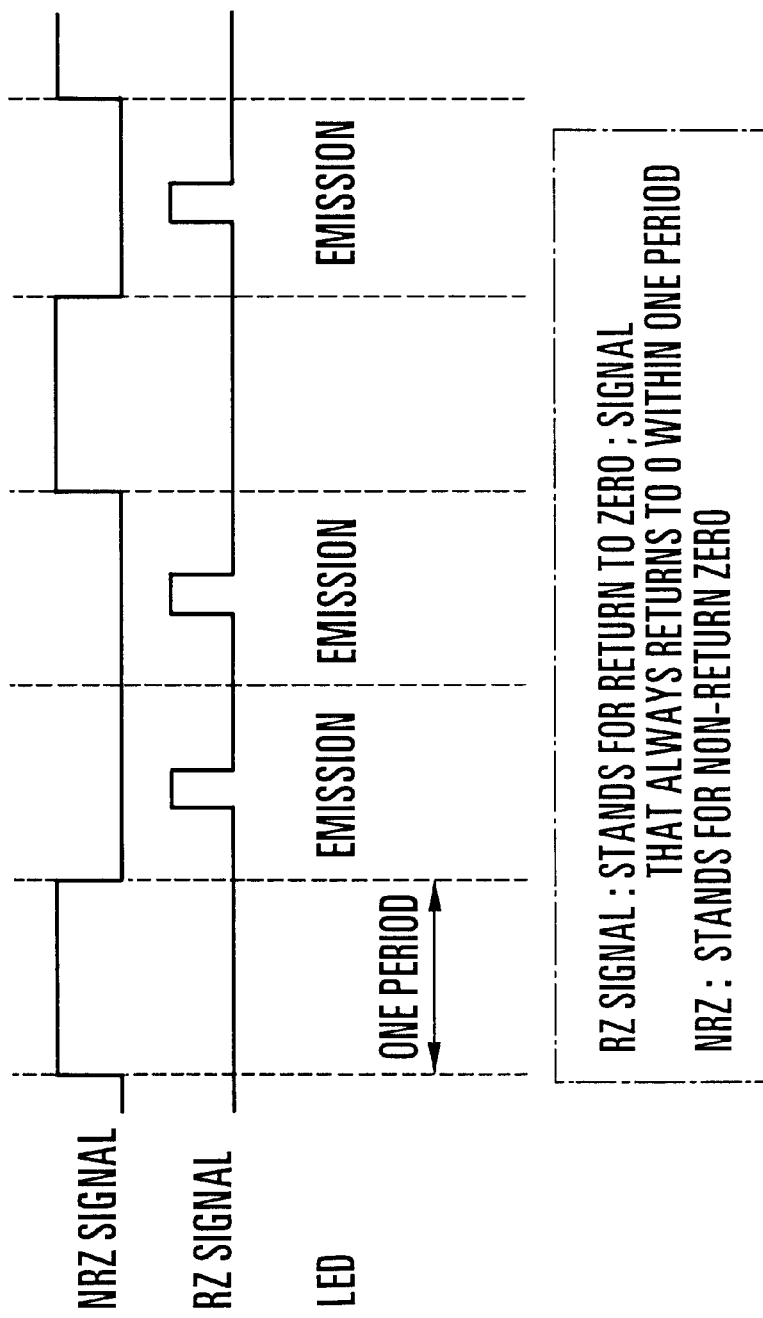
FIG. 3 is a timing chart for explaining the operations of an infrared communication processing section and infrared receiving/emitting section in the portable telephone in FIG. 1.

The light-emitting circuit of the infrared receiving/emitting section 115 emits infrared light at the pulse portions of the RZ serial signal, as shown in FIG. 3.

Upon reception of infrared light, the light-receiving circuit of the infrared receiving/emitting section 115 generates an RZ pulse electrical signal and outputs it to the demodulation circuit of the infrared communication processing section 114. The demodulation circuit converts the RZ serial signal into an NRZ serial signal. The start-stop synchronization serial communication circuit receives the NRZ serial signal from the demodulation circuit and converts it into parallel data. The CPU of the control section 103 loads the parallel data through the bus.

The authentication code used in infrared communication with the automobile system 200 is held in the ID memory 106. In infrared communication, the CPU of the control section 103 reads out the authentication code from the ID memory 106 and transmits this code in the above procedure. Infrared communication is started when the user presses the button of the KEY input section 107 which is assigned to infrared communication. The speech communication mode state switched as a result of the infrared communication is displayed on a display section 108.

The portable telephone 100 has a cradle attachment/detachment detection section 109. The cradle attachment/detachment detection section 109 is, for example, a switch pressed by a projection of the cradle 205 when the portable telephone 100 is placed on a cradle 205 of the automobile system 200. The cradle attachment/detachment detection section 109 detects attachment/detachment (mounting or dismounting) of the portable telephone 100 to/from the cradle 205 by detecting pressing or releasing operation by the projection of the cradle 205.

Assume that a cradle incorporating an infrared communication function is to be used as the cradle 205. In this case, signals are periodically generated by infrared communication to allow determination of attachment/detachment of the portable telephone 100 to/from the cradle 205 depending on whether a return signal is sent from the cradle 205 without using any hardware detection means such as the cradle attachment/detachment detection section 109 (confirming the present of the third party by this information communication will be termed "discovery" hereinafter).

The antenna 101 of the portable telephone 100 transmits/receives phase-modulated radio waves. The radio transmission/reception section 102 demodulates the radio waves received through the antenna 101 and phase-modulates a digital signal from the control section 103 or signal processing section 110. The signal processing section 110 is constituted by a DSP and the like and performs compression/expansion and the like for a speech signal. A sounder 111 outputs a ringing tone and the like. A microphone 112 inputs speech. A receiver 113 outputs the speech received through the antenna 101 and processed by the signal processing section 110.

The control section 103 controls the respective sections. For example, the control section 103 detects the call number to the self-device from the signal demodulated by the radio transmission/reception section 102 and controls the signal processing section 110 to make the sounder 111 generate a ringing tone. In general, the control section 103 also includes a timepiece means such as a timer. The call number to the self-device is also held in the ID memory 106. The control section 103 reads out this call number and collates it with data at a predetermined position in a demodulated signal. The ROM 104 is used to store operation programs and fixed data for the CPU of the control section 103. The RAM 105 is a memory for temporarily holding data.

In the automobile system 200 described above, the infrared receiving/emitting section 201, the infrared communication processing section 202, a ROM 211, and a RAM 210 are respectively identical to the infrared receiving/emitting section 115, the infrared communication processing section 114, the ROM 104, and the RAM 105 in FIG. 1, and hence a description thereof will be omitted.

The control section 203 is constituted by a CPU and the like and controls the respective sections. The control section 203 incorporates a timepiece means such as a timer. The door lock actuator 206 locks/unlocks the automobile door. The engine rpm detection section 207 detects the rpm of the engine and notifies the control section 203 of the detected state. A gear position detection section 208 detects the current gear position of the automobile incorporating an AT (Automatic Transmission) and notifies the control section 203 of the detected state. The electrical system detection section 209 detects the ON/OFF state of the headlights, the ON/OFF state of the hazard lamps, the ON/OFF state of the car stereo, the ON/OFF state of the air conditioner, the ON/OFF state of the wiper, and the like and notifies the control section 203 of the detected state.

The authentication code used in infrared communication with the portable telephone 100 is held in the ID memory 204. In infrared communication, the CPU of the control section 203 reads out the authentication code from the ID memory 204 and collates it with data from the infrared communication processing section 202.

The cradle 205 having an infrared communication function is an in-car cradle having a function equivalent to the infrared receiving/emitting section 201 and infrared communication processing section 202. The cradle 205 is an indispensable component for a feature of the present invention. While the portable telephone 100 is placed on the cradle 205, data is communicated between the cradle 205 and the portable telephone 100 by infrared radiation. The types of data to be communicated include speech data. During communication of speech data, the cradle 205, a signal processing section 212 for compressing/expanding speech data, a speaker 213 for output speech, and a microphone 214 for inputting speech constitute a hand-free system.

Remote control on the automobile system 200 by means of the infrared communication function of the portable telephone 100 and switching of the speech communication modes of the portable telephone 100 will be described next with reference to the flow chart of FIGS. 4A and 4B and the block diagrams of FIGS. 1 and 2.

Figures 4A, 4B:
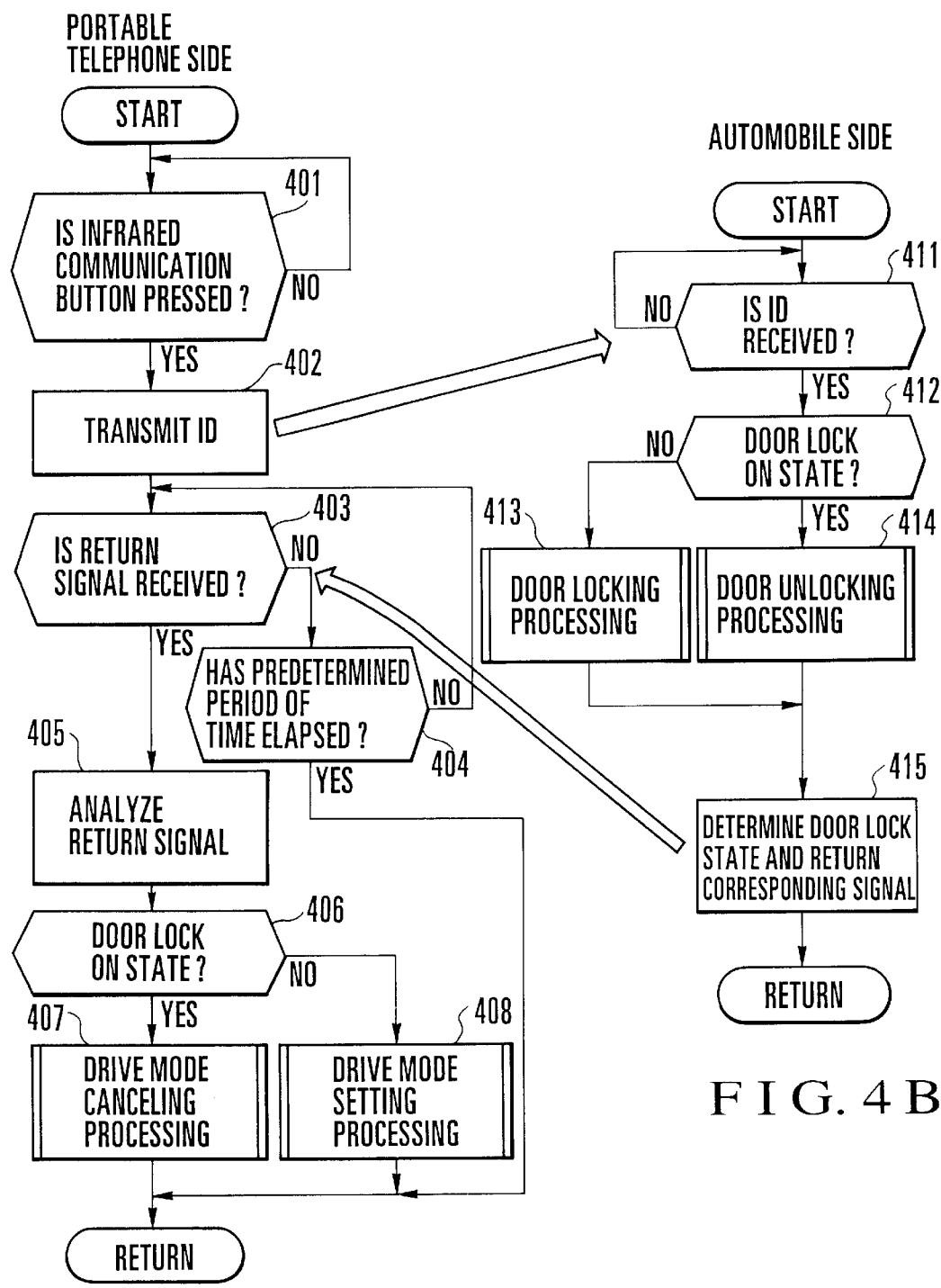
FIGS. 4A and 4B are flow charts for explaining speech communication mode switching operation in the portable telephone in FIG. 1.

FIG. 4A shows the flow of processing performed by the control section 103 in the portable telephone 100. FIG. 4B shows the flow of processing performed by the control section 203 in the automobile system 200.

When the button of the KEY input section 107 which is assigned to infrared communication is pressed (YES in step 401), the control section 103 of the portable telephone 100 reads out the authentication code from the ID memory 106 and transmits it by infrared radiation (step 402). The control section 103 then waits for a return signal from the automobile system 200. (step 403).

A time-out of this return signal wait state occurs after a lapse of a predetermined period of time (YES in step 404). Upon reception of a return signal within the predetermined period of time, the control section 103 analyzes the contents of the signal (step 405). If the signal represents the door lock OFF state on the automobile system 200 side (NO in step 406), the speech communication mode is set to the drive mode (step 408).

If the signal represents the door lock ON state (YES in step 406), the control section 103 cancels the drive mode (step 407). The current speech communication mode is then displayed on the display section 108 with an icon or the like.

In this case, the drive mode is, for example, the D mode described above, the mode of only playing back a prerecorded response message and recording a message without generating any ringing tone, or the mode of allowing only reception of data.

The control section 203 of the automobile system 200 is always in the infrared reception wait state. If the authentication code is detected from the received data (YES in step 411), the control section 203 detects the current door lock state from the door lock actuator 206. If the door lock ON state is set (YES in step 412), the control section 203 controls the door lock actuator 206 to perform unlocking processing (step 414). If the door lock OFF state is set (NO in step 412), the control section 203 performs locking processing (step 413).

The control section 203 detects the door lock state from the door lock actuator 206 again, and transmits (returns) a signal corresponding to the detection state to the portable telephone 100 (step 415). Note that the signal corresponding to the door lock state is determined in advance between the portable telephone 100 and the automobile system 200.

As described above, the portable telephone 100 is used as an external remote control terminal for the automobile system 200. The portable telephone 100 has the function of changing the door lock state of the automobile system 200 and the function of switching the speech communication modes of the self-device. When the driver unlocks the door lock of the automobile by using the portable telephone 100 and gets into the automobile, the speech communication mode of the portable telephone 100 is automatically set to the drive mode. When the driver gets off the automobile and locks the door by using the portable telephone 100, the drive mode of the portable telephone 100 is automatically canceled.

This allows the user to execute both the action of ON/OFF-controlling (locking/unlocking) the door lock and the action of setting/canceling the drive mode of the portable telephone 100 with one operation, thereby preventing the driver from forgetting to set the drive mode during driving and from forgetting to cancel the drive mode after driving. In addition, the action of locking the door by using the portable telephone 100 prevents the driver from leaving the portable telephone 100 in the automobile.

Furthermore, in this embodiment, since the current speech communication mode is displayed on the display section 108 of the portable telephone 100 by an icon or the like, even if the driver forgets to lock the door and leaves the automobile, the driver can notice that he/she has forgotten to lock the door. In this case, since the information indicating the drive mode is kept displayed as the current speech communication mode on the display section 108 of the portable telephone 100, the driver sees this information on the display section 108 and can notice that he/she has forgotten to lock the door.

Second Embodiment

The second embodiment of the present invention will be described in detail next with reference to the accompanying drawings. The arrangements of a portable telephone 100 and automobile system 200 in the second embodiment are the same as those in the first embodiment.

Figures 5A, 5B:
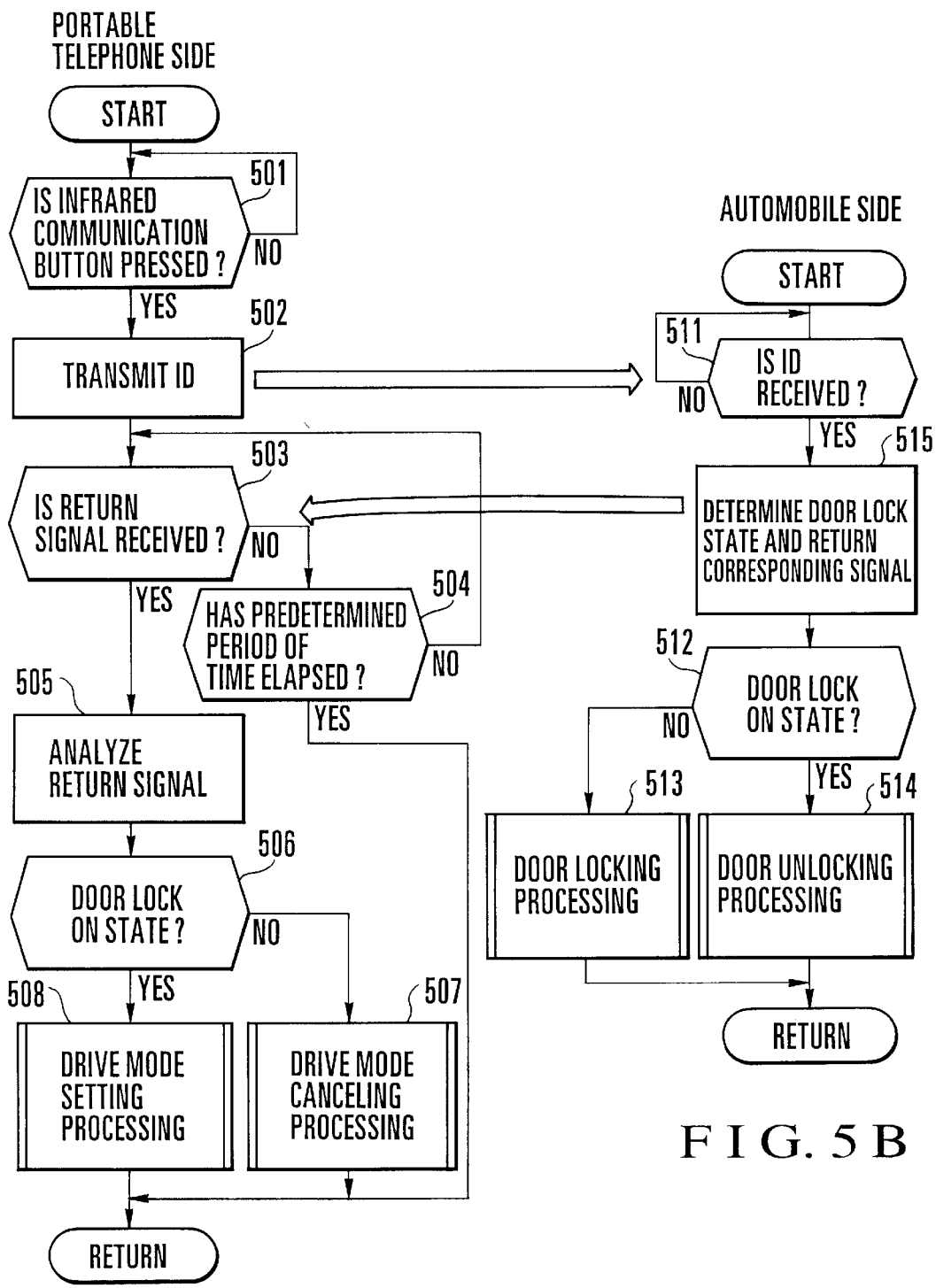
FIGS. 5A and 5B are flow charts for explaining speech communication mode switching operation in a portable telephone according to the second embodiment of the present invention.
Figures 6A, 6B:
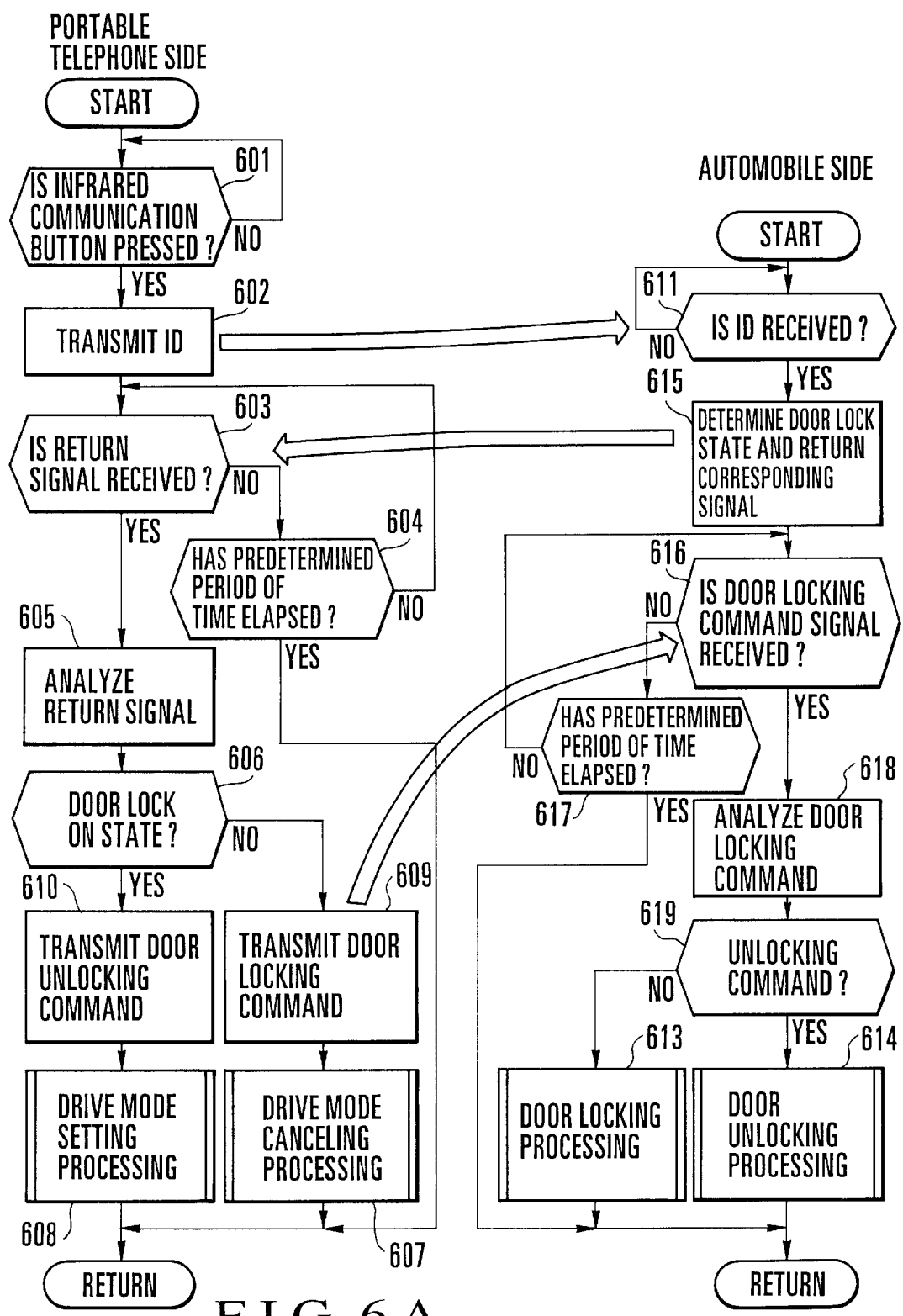
FIGS. 6A and 6B are flow charts for explaining speech communication mode switching operation in a portable telephone according to the third embodiment of the present invention.

FIG. 5A shows the flow of processing performed by a control section 103 in the portable telephone 100. FIG. 5B shows the flow of processing performed by a control section 203 in the automobile system 200.

The control section 203 of the automobile system 200 receives an authentication code (YES in step 511), and then returns information indicating the current door lock state to the portable telephone 100 by infrared radiation (step 515) before changing the door lock state. Thereafter, the control section 203 changes the door lock state (steps 512, 513, and 514).

Upon reception of the return signal from the automobile system 200 (YES in step 503) after transmission of the authentication code (step 502), the control section 103 of the portable telephone 100 analyzes the contents of the signal (step 505). The control section 103 sets/cancels the drive mode upon determining that the actual door lock state of the automobile system 200 is switched to the opposite side to the door lock state indicated by the return signal (steps 506, 507, and 508). The current speech communication mode is displayed on a display section 108 by an icon or the like.

In the first embodiment, the speech communication modes of the portable telephone 100 are switched after the door lock states of the automobile system 200 are switched. In the second embodiment, door lock state switching on the automobile system 200 side and speech communication mode switching on the portable telephone 100 side are concurrently performed. Therefore, the total processing efficiency of the second embodiment is higher than that of the first embodiment, but the reliability of the first embodiment, in which the door lock state is notified after the door lock states are actually switched on the automobile system 200, is higher than that of the second embodiment.

Third Embodiment

The third embodiment of the present invention will be described in detail next with reference to the accompanying drawings. The arrangements of a portable telephone 100 and automobile system 200 in the third embodiment are also the same as those in the first embodiment.

A control section 203 of the automobile system 200 returns information indicating the current door lock state to the portable telephone 100 (step 615) upon reception of an authentication code, as in the second embodiment. A door lock command wait state is then set (step 616).

Upon reception of the return signal from the automobile system 200 (YES in step 603) after transmission of the authentication code (step 602), a control section 103 of the portable telephone 100 analyzes the contents of the signal (step 605). If the return signal indicates the door lock ON state (YES in step 606), the control section 103 transmits an unlock command to the automobile system 200 by infrared radiation (step 610) and sets the speech communication mode to the drive mode (step 608). If the return signal indicates the door lock OFF state, the control section 103 transmits a lock command to the automobile system 200 by infrared radiation (step 609) and cancels the drive mode (step 607). The current speech communication mode is displayed on a display section 108 by an icon or the like.

A time-out of the door lock command wait state (step 616) on the automobile system 200 side occurs after a lapse of a predetermined period of time (YES in step 617). Upon reception of the door lock command within the predetermined period of time, the control section 203 analyzes the contents of the command (step 618). If the door lock command is an unlock command (YES in step 619), the control section 203 performs unlocking processing (step 614). If the command is a lock command (NO in step 619), the control section 203 performs locking processing (step 613). Note that codes corresponding to the lock and unlock commands are determined in advance between the portable telephone 100 and the automobile system 200. In this manner, an improvement in reliability is attained.

Fourth Embodiment

In the third embodiment, the automobile system 200 may notify the portable telephone 100 of the door lock state after locking or unlocking processing, and the control section 103 of the portable telephone 100 may set or cancel the drive mode after checking the actual door lock state upon reception of this notification. This can further improve the reliability.

Fifth Embodiment

In the first to fourth embodiments, communication between the infrared receiving/emitting section 115 of the portable telephone 100 and the infrared receiving/emitting section 201 of the automobile system 200 has been described above. In this embodiment, communication between an infrared receiving/emitting section 115 of a portable telephone 100 and a cradle 205 with an infrared communication function in an automobile system 200 will be described below.

Prior to a description of communication between the infrared receiving/emitting section 115 and the cradle 205, the arrangement shown in FIG. 1 will be further described. In the portable telephone 100 in FIG. 1, the speech data processed input through the microphone 112 and processed by the signal processing section 110 can be stored in the RAM 105 or ROM (flash memory) 104 (recording of speech memo and automatic answering message). This allows the speech data stored in the RAM 105 or ROM 104 to be played back through the signal processing section 110 and receiver 113 (playback of speech memo) as well as the speech data received through the antenna 101 and demodulated by the reception section of the radio transmission/reception section 102. In addition, not only the speech data input through the microphone 112 and processed by the signal processing section 110 but also the speech data stored in the RAM 105 or ROM 104 can be transmitted by radio waves through the control section 103 and the antenna 101 of the radio transmission/reception section 102 (playback of automatic answering message). Obviously, the speech data stored in advance in the ROM 104 can be played back and transmitted.

Figure 7:
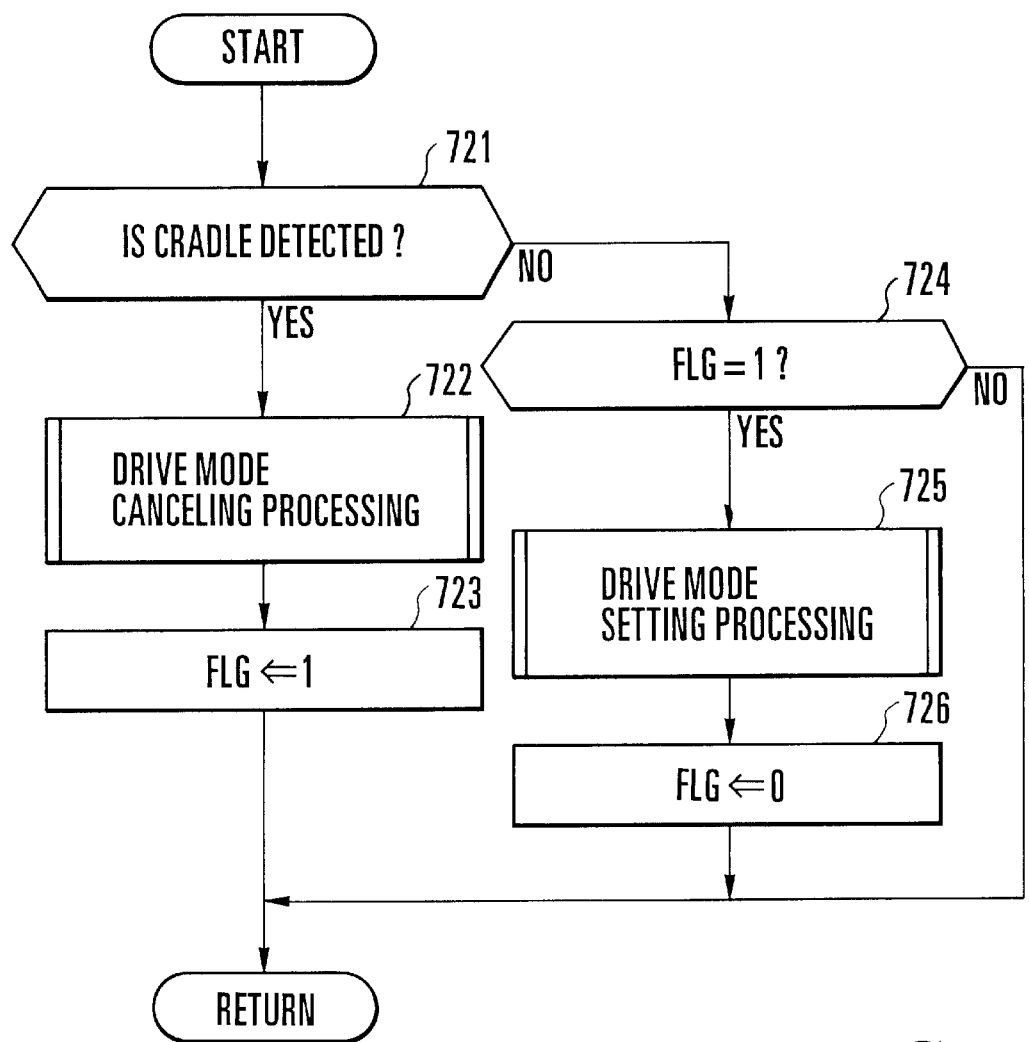
FIG. 7 is a flow chart for explaining drive mode canceling operation when a portable telephone is placed on an in-car cradle in the fifth embodiment of the present invention.

As shown in the flow chart of FIG. 7, when the cradle attachment/detachment detection section 109 detects that the portable telephone 100 is placed on the cradle 205 (step 721), the control section 103 of the portable telephone 100 cancels the automatically set drive mode (step 722), and sets a flag FLG to FLG=1 (step 723). Note that attachment/detachment of the cradle 205 to/from the portable telephone 100 can also be detected by the method based on "discovery".

If detachment of the portable telephone 100 from the cradle 205 is detected (NO in step 721) and the flag FLG is FLG=1 (YES in step 724), the control section 103 sets the drive mode again (step 725), and sets the flag FLG to FLG=0 (step 726).

With this operation, the driver is allowed only to perform speech communication while the portable telephone 100 is placed on the cradle 205, i.e., in a hand-free state.

Sixth Embodiment

As shown in the flow charts of FIGS. 8A and 8B, while a portable telephone 100 is placed on a cradle 205, a control section 203 of an automobile system 200 detects the movement of the gear through a gear position detection section 208 (step 841) and checks whether the gear has moved to the parking position (step 842). If the gear has moved to the parking position (YES in step 842), the control section 203 transmits gear position change information indicating that the gear has moved to the parking position to the portable telephone 100 by infrared radiation (step 843).

If the gear has not moved to the parking position (NO in step 842), the control section 203 checks whether the gear has moved from the parking position (step 844). If the gear has moved from the parking position (YES in step 844), the control section 203 transmits gear position change information indicating that the gear has moved from the parking position (shift from parking position) to the portable telephone 100 by infrared radiation (step 845).

Only when gear position change information is received from the automobile system 200 (step 831) and the gear position change information indicates that the gear has moved to the parking position (YES in step 832), i.e., the parking state is set, the control section 103 of the portable telephone 100 cancels the automatically set drive mode (step 833).

If the gear position change information indicates that the gear has moved from the parking position (YES in step 834), the control section 103 sets the drive mode again (step 835). The drive mode in this case may be a mode of inhibiting originating operation to permit the user to perform speech communication only in the parking state. In addition, if the detection result obtained by an engine rpm detection section 207 is sent to the portable telephone 100, the drive mode can be switched depending on whether the automobile is parked or traveling at a low speed.

As described above, when attachment of the portable telephone 100 to the cradle 205 is detected, the drive mode is canceled in accordance with a signal indicating the automobile state from the automobile system 200. Only when the automobile is parked, therefore, the drive mode is canceled to allow hand-free speech communication. While the automobile is traveling, hand-free speech communication can be inhibited. In addition, only when the automobile is traveling at a low speed, the drive mode can be canceled to allow hand-free speech communication.

Seventh Embodiment

Figures 9A, 9B:
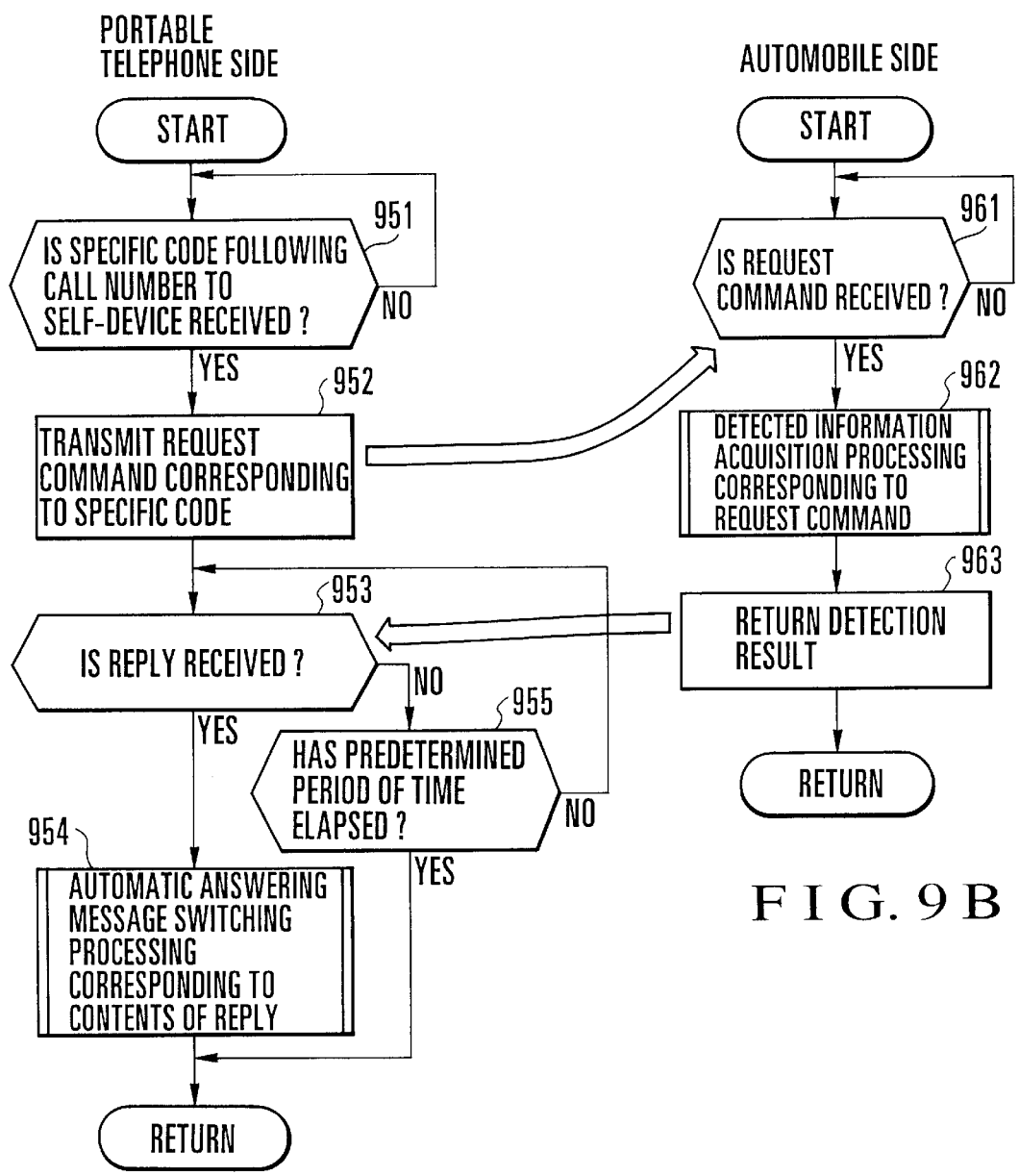
FIGS. 9A and 9B are flow charts for explaining checking operation at each section in an automobile system through a portable telephone in the seventh embodiment of the present invention.

As shown in the flow charts of FIGS. 9A and 9B, upon reception of a special code following the call number to the self-device is received by radio waves (YES in step 951), a control section 103 of a portable telephone 100 transmits a request command corresponding to the specific code to an automobile system 200 (step 952). Upon reception of a reply to the request command (YES in step 953), the control section 103 switches automatic answering messages in accordance with the contents of the reply (step 954).

Upon reception of the request command from the portable telephone 100 (YES in step 961), a control section 203 of the automobile system 200 acquires information from each detection section in accordance with the contents of the request command (step 962). The control section 203 returns the detection result to the portable telephone 100 by infrared radiation (step 963).

As a means for allowing the portable telephone 100 to receive a specific code by radio waves, the short mail service is available from, for example, NTT DoCoMo. In a pager, when a specific code is included in a message, the code is converted into a fixed standardized expression. Likewise, if a specific code is included in short mail, the portable telephone 100 issues a request command by infrared radiation.

Assume that a request command for requesting to check whether the door is locked is "01"; a specific code corresponding to this request command, "##01"; the reply "the door is not locked", "0"; the reply "the door is locked", "1"; an automatic answering message to the reply "0", "the door is not locked"; and an automatic answering message to the reply "1", "the door is locked". When the user who has left the portable telephone 100 on a cradle 205 transmits "##01" as short mail from a public telephone or the like to the portable telephone 100, the portable telephone 100 transmits the request command "01" to the automobile system 200 upon reception of the short mail.

Upon reception of this request command, the automobile system 200 acquires information indicating the lock state from a door lock actuator 206. If the door is not locked, the automobile system 200 transmits the reply "0" to the portable telephone 100. Upon reception of this reply, the portable telephone 100 switches the automatic answering message to "the door is not locked". When the user makes a call to the portable telephone 100 afterward, the portable telephone 100 is switched to the automatic answering message playback mode after a lapse of a predetermined period of time, and outputs the automatic answering message "the door is not locked". In this manner, the user can check the state of the automobile. Similarly, for example, the user can check by remote control whether he/she has forgotten to turn off the headlights or hazard lamps.

To achieve the purpose of the automatic answering messages, as specific codes to be included in short mail, a specific code for restoration to the initial automatic answering message (switching the automatic answering messages) must be prepared as well as a code corresponding to a request command. Upon reception of this specific code by radio waves, the control section 103 restores the automatic answering message to the initial message, thus preventing the automatic answering message from being kept switched. Alternatively, the time elapsed after the automatic answering messages are switched may be measured by using the timepiece means (timer) of the portable telephone 100, and the control section 103 may restore the automatic answering message to the initial message after a lapse of a predetermined period of time. With this operation, the initial automatic answering message is always restored after a lapse of the predetermined period of time. Furthermore, the automatic answering messages may be switched only when the portable telephone 100 is placed on the cradle 205, and the control section 103 may restore the initial automatic answering message upon detection of detachment of the portable telephone 100 from the cradle 205. Alternatively, after the switched automatic answering message is played back once, the control section 103 may restore the initial automatic answering message.

Note that a specific code must partially contain a code independently determined by the user in consideration of security. Automatic answering messages may be recorded by the user through the microphone 112 or may be fixed standardized expressions stored in the ROM 104 in advance.

As described above, upon reception of a predetermined code following the call number to the self-device by radio waves, the portable telephone 100 transmits a request command corresponding to the code using the infrared communication function. This allows the user to check by remote control, for example, whether he/she has forgotten to lock the door and turn off the headlights or hazard lamps. In addition, answering messages to be played back are switched in accordance with the signal received by the infrared communication function. If, therefore, information indicating that the door is not locked is obtained from the automobile system 200, the door lock state can be notified to the user, who accesses the system by remote control, by switching the answering message to the contents "the door is not locked".

Eight Embodiment

Figures 10A, 10B:
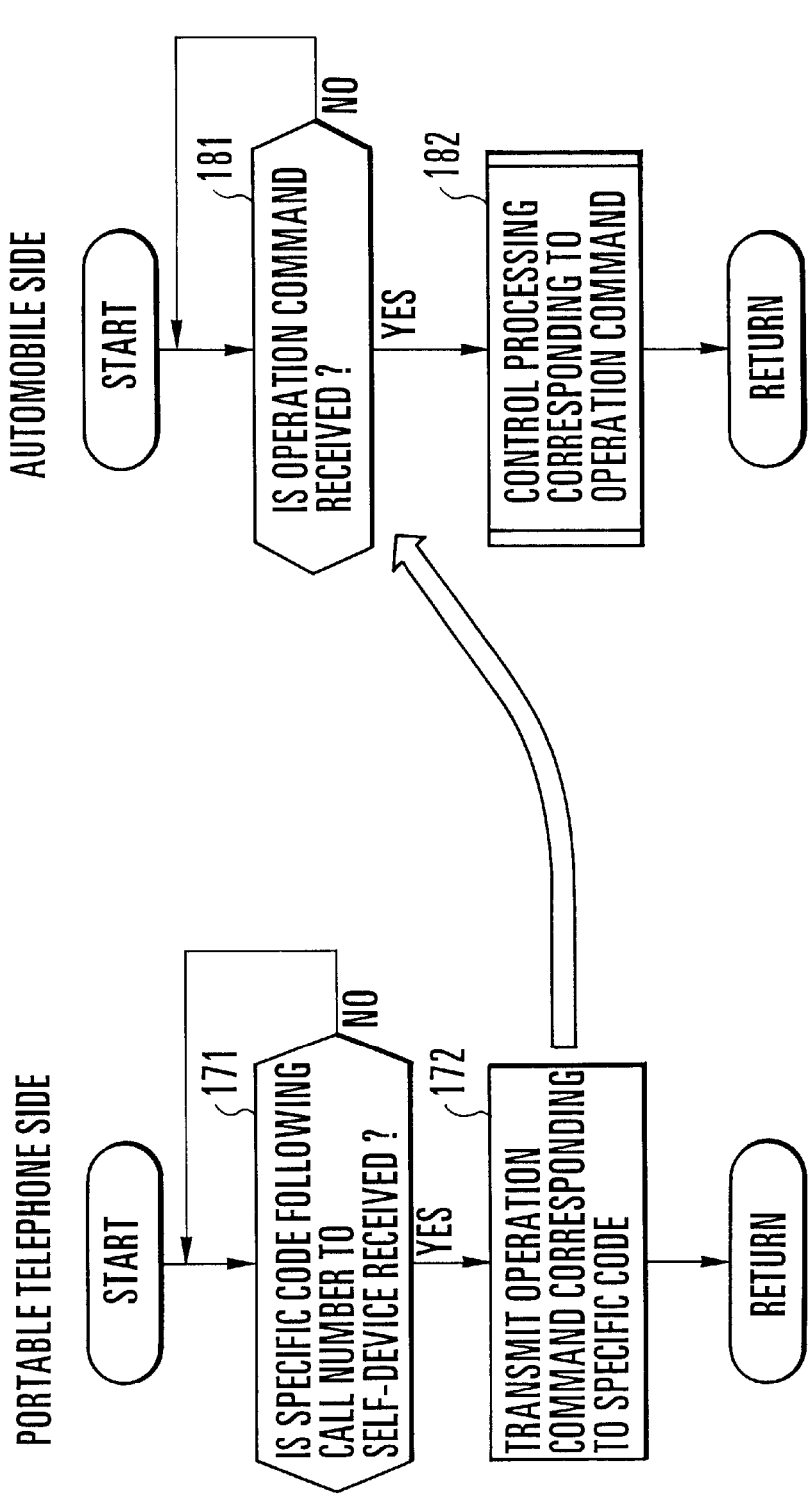
FIGS. 10A and 10B are flow charts for explaining control operation at each section in an automobile system through a portable telephone in the eighth embodiment of the present invention.

As shown in the flow charts of FIGS. 10A and 10B, upon reception of a specific code following the call number to the self-device by radio waves (YES in step 101), a control section 103 of a portable telephone 100 transmits an operation command corresponding to the specific code to an automobile system 200 by infrared radiation (step 172).

Upon reception of the operation command from the portable telephone 100 (YES in step 181), a control section 203 of the automobile system 200 controls the respective sections in accordance with the contents of the operation command (step 182).

Assume that "11" represents an operation command for "door locking", and "##11" represents a specific code corresponding to this operation command. When the user who has left the portable telephone 100 on a cradle 205 transmits "##11" as short mail from a public telephone or the like to the portable telephone 100, the portable telephone 100 receives it and transmits the operation command "11" to the automobile system 200. Upon reception of this operation command, the automobile system 200 controls a door lock actuator 206 to lock the door. Likewise, for example, the user can unlock the door or turn off the headlights by remote control.

As described above, upon reception of a predetermined code following the call number to the self-device, the portable telephone 100 transmits an operation command corresponding to the code by infrared radiation. This allows the user to, for example, lock the door and turn off the headlights and hazard lamps by remote control.

In addition, the user can control and check the state of the automobile by remote control by combining the seventh and eighth embodiments.

Ninth Embodiment

As shown in the flow charts of FIGS. 11A and 11B, a control section 203 of an automobile system 200 measures the time elapsed after the gear position is set to the parking position and the engine is stopped (YES in step 302) with a timepiece means (timer). If the door is kept unlocked or the headlights are kept turned on (YES in step 305) after a lapse of a predetermined period of time (YES in step 303), the control section 203 transmits a code corresponding to the abnormal state to the portable telephone 100 by infrared radiation (step 306).

Upon reception of the abnormal code from the automobile system 200 (YES in step 391), a control section 103 of a portable telephone 100 dials a predetermined telephone number (e.g., the home telephone number of the user) (step 392). When the other party answers the call (YES in step 393), the control section 103 plays back the speech message stored in the RAM 105 or ROM 104 and corresponding to the abnormal code (step 394), and then disconnects the speech communication (step 395). With this operation, if, for example, the door is kept unlocked, the speech message "the door is not locked" is passed to the user. If the headlights are kept turned on, the speech message "the headlights are kept on" can be passed to the user.

As described above, upon reception of a signal representing an abnormal state from the automobile system 200, the portable telephone 100 transmits the message corresponding to the abnormal state to a predetermined telephone number. The user can therefore be informed of abnormal states at the respective portions of the automobile, e.g., states in which the door is left unlocked and the headlights or hazard lamps are kept on, through the portable telephone 100.

With a combination of the seventh, eight, and ninth embodiments, for example, the user who lives in an apartment house that is remote from a parking lot can receive a notification indicating the abnormal state of the automobile from the portable telephone 100 left on the cradle 205 in the automobile after he/she comes home. Then, the user can perform control to restore the normal state by remote control using the portable telephone 100, and can check the state after the control.

10th Embodiment

Each embodiment described above is associated with communication between the portable telephone 100 and the automobile system 200, each having the infrared communication function. Consider a public facility having apparatuses for limiting the comings and goings of persons by infrared communication, e.g., automated ticket gates in a station. When the user of a portable telephone having an infrared communication function, to which ticket purchase information is transferred from a ticket machine having an infrared communication function, enters or leaves the public facility by using the infrared communication function of the portable telephone having the transferred information, the speech communication mode of the portable telephone can be automatically changed.

In this case, the speech communication mode to be set when the user enters the public facility is either a mode like a kind of pager mode, in which only data communication is permitted, only automatic unattended recording is permitted, or only incoming call records can be made, that is, a mode of informing the user of at least the reception of an incoming call without bothering other people around the user, or a mode of turning off the power supply and inhibiting the telephone from being powered on unless the user leaves the facility by using infrared communication.

Recently, public facilities have appeared, in which the use of portable telephones is inhibited by jamming transmissions. The 10th embodiment can be effectively applied as an alternative system to such a facility for the following reasons. When the function limiting mode of the portable telephone is used, the user can know at least the reception of an incoming call. If the caller uses the number display service or the user can guess the caller, the user can make a call after he/she leaves the facility. In addition, the mode of turning off the power supply of the portable telephone is effective for a facility in which generation of electromagnetic waves itself is a problem. If the mode of turning off the power supply of the portable telephone is used, there is no need to use written explanatory notes informing that jamming waves are emitted by the facility. This also saves paper resources.

What is claimed is:

1. A portable telephone comprising:
   infrared communication means; and
   speech communication mode switching means for switching speech communication modes in accordance with a signal received from a distant system through said infrared communication means.

2. A telephone according to claim 1, wherein said communication mode switching means sets the speech communication mode to a drive mode when the signal received from a distant automobile system through the infrared communication means indicates a door lock OFF state, and cancels the drive mode when the received signal indicates a door lock ON state.

3. A telephone according to claim 1, wherein said speech communication mode switching means sets the speech communication mode to the drive mode upon determining, in accordance with the signal received from said automobile system through said infrared communication means, that the door lock state is switched to an OFF state in the automobile system, and cancels the drive mode upon determining that the door lock state is switched to an ON state.

4. A telephone according to claim 1, further comprising display means for displaying the current speech communication mode.

5. A telephone according to claim 1, further comprising:
   cradle attachment/detachment detection means for detecting attachment/detachment to/from an in-car cradle; and drive mode setting/canceling means for canceling the speech communication mode set to the drive mode when said cradle attachment/detachment detection means detects attachment to said in-car cradle.

6. A telephone according to claim 5, wherein said drive mode setting/canceling means cancels the speech communication mode set to the drive mode in accordance with a vehicle state signal received from said distant automobile system through said infrared communication means when attachment to said in-car cradle is detected.

7. A portable telephone comprising:

infrared communication means; and transmission means for, when a predetermined code is received by a radio wave, transmitting a command corresponding to the code to a distant system through said infrared communication means.

8. A telephone according to claim 7, further comprising:

a memory in which prepared speech answering messages are stored; and means for switching the speech answering messages to be played back in accordance with a signal corresponding to the command and received from said distant system through said infrared communication means.

9. A telephone according to claim 8, further comprising means for restoring the switched speech answering message to an initial message after a lapse of a predetermined period of time.

10. A telephone according to claim 8, further comprising means for restoring the switched speech answering message to the initial message after being played back.

11. A telephone according to claim 7, further comprising:

a memory in which prepared speech answering messages are stored;

cradle attachment/detachment detection means for detecting attachment/detachment to/from an in-car cradle;

means for switching the speech answering messages to be played back in accordance with a signal corresponding to the command and received from said distant system through said infrared communication means only when said cradle attachment/detachment detection means detects attachment to said in-car cradle; and means for restoring the switched speech answering message to the initial message when detachment from said in-car cradle is detected.

12. A portable telephone comprising:

infrared communication means; and originating means for receiving a signal indicating an abnormal state and received from a distant automobile system through said infrared communication means, and originating a speech message corresponding to the abnormal state to a predetermined telephone number.

13. An automobile system comprising:

infrared communication means for communicating with a portable telephone having an infrared communication function; and transmission means for transmitting a detection result corresponding to a command received from said portable telephone through said infrared communication means to said portable telephone by using said infrared communication means.

14. A system according to claim 13, wherein said system further comprises vehicle information detection means for detecting vehicle information, and said transmission means transmits a detection result obtained by said vehicle information detection means to said portable telephone.

15. An automobile system comprising:

infrared communication means for communicating with a portable telephone having an infrared communication function; and control means for performing control processing in accordance with an operation command received from said portable telephone through said infrared communication means.

16. An automobile system comprising:

infrared communication means for communicating with a portable telephone having an infrared communication function; and vehicle information detection means for detecting vehicle information; and transmission means for, when said vehicle information detection means detects an abnormal state, transmitting a signal indicating the abnormal state to said portable telephone through said infrared communication means.

* * * * *